United States Patent [19]

Turner et al.

[11] Patent Number: 4,754,920

[45] Date of Patent: Jul. 5, 1988

[54] COMPACT OPERATOR FOR GAS CONTROL VALVES

[75] Inventors: Jesse H. Turner; Robert A. Van Fossen, both of Auburn, Ind.

[73] Assignee: Hamilton Standard Controls, Inc., Farmington, Conn.

[21] Appl. No.: 936,066

[22] Filed: Nov. 28, 1986

[51] Int. Cl.⁴ .................................. G05D 15/00
[52] U.S. Cl. .......................... 236/68 R; 236/DIG. 1; 60/529
[58] Field of Search .......... 236/68 R, 101 E, DIG. 1, 236/48 R, 87; 251/11; 60/529

[56] References Cited

U.S. PATENT DOCUMENTS

| | | | |
|---|---|---|---|
| 2,800,555 | 7/1957 | Sundt | 200/122 |
| 3,203,166 | 8/1965 | Flanagan | 60/23 |
| 3,227,370 | 1/1966 | Houser | 236/48 |
| 3,451,421 | 6/1969 | Vicenzi et al. | 137/495 |
| 3,489,350 | 1/1970 | Caparone | 236/68 |
| 3,526,360 | 7/1970 | Ray | 236/68 |
| 3,747,629 | 7/1973 | Bauman | 137/270 |
| 3,873,059 | 3/1975 | Meckstroth | 251/11 |
| 4,009,861 | 3/1977 | Hirst | 251/61.1 |
| 4,168,719 | 9/1979 | Renshaw | 137/312 |
| 4,354,633 | 10/1982 | Turner et al. | 236/1 H |

Primary Examiner—William E. Wayner

[57] ABSTRACT

A compact linear operator is provided for a gas valve. The operator may be of modular form for operative combination with combination gas controls of existing design, as by threaded engagement with an existing threaded bore in the control. The operator is suited for directly controlling displacement of a valve or more typically, for controlling displacement of the seat for the regulating spring associated with a servo pressure regulating diaphragm/valve arrangement. The operator includes a controllably heated bimetallic actuator, and a plunger directly or indirectly driven linearly by deflection of the actuator. To enhance compactness of the operator, a displacement-amplifying lever is interposed between the actuator and the plunger. Stops are included for establishing "high fire" and "low fire" limits for the regulated gas pressure.

16 Claims, 4 Drawing Sheets

COMPACT OPERATOR FOR GAS CONTROL VALVES

DESCRIPTION

1. Technical Field

The present invention relates generally to an operator for use with control valves and more particularly to a linear operator for gas control valves. More particularly still, the invention relates to an operator for a servo pressure regulator in a combination gas control.

2. Background Art

In the prior art, combination gas valves having a main diaphragm-operated valve and a servo regulator which regulates the output pressure by controlling the pressure in a control chamber relative to the inlet pressure, are well known. Typically, the servo regulator is also provided by a diaphragm. Examples of the aforementioned type of gas valve are disclosed in U.S. Pat. Nos. 4,099,861 and 4,354,633. Each of those patents discloses a combination gas control contained within a housing or casing, which includes a threaded opening in registry with the servo pressure regulator diaphragm. Further, an adjustable screw is threaded into the threaded opening in the casing for adjustably presetting the reference load or force applied by a pressure regulating spring to the regulator diaphragm. This arrangement, though relatively simple and inexpensive, affords only a constant preset reference force by the spring on the pressure regulator diaphragm during operation.

In other combination controls, provisions have been made for effecting some degree of variability to the reference force applied to the servo regulator diaphragm by the pressure regulating spring during operation of the control. Typically that variability of the reference force is obtained by adjusting the displacement, or positioning, of a seat member which urges the spring into compressive engagement with the regulator diaphragm. One means for effecting such displacement of the spring seat member is through the use of an electromagnetic linear positioner, such as a solenoid or the like. Another technique, disclosed in detail in U.S. Pat. Nos. 3,227,370; 3,489,350; and 3,526,360, involves the use of a heated bimetallic actuator for controlling the displacement of the spring seat member.

While these latter combination controls are capable of stepping and/or modulating the regulated gas pressure during operation, as well as providing high and/or low gas pressure limits, it will be seen that the requisite structure is relatively complex and more importantly, requires a relatively large amount of space. Typically, such space is provided by prior design of the combination control's housing or casing to incorporate the requisite operating and actuating structures therewithin.

In some instances, however, it may be either desirable or necessary to provide such an operator which is relatively more compact and/or less complex than any existing in the prior art. A particular such need exists if it is desired to convert the "constant" pressure regulating mechanism of the aforementioned U.S. Pat. Nos. 4,009,861 and 4,354,633 to a variable operator of the general type depicted in the aforementioned U.S. Pat. Nos. 3,227,370; 3,489,350; and 3,526,360.

DISCLOSURE OF THE INVENTION

It is a principal object of the invention to provide an improved operator of the type employing a heated bimetallic actuator for controlling the positioning of a spring seat or similar valve-controlling member during operation of a combination gas control. Included within this object is the provision of an operator which is relatively compact.

It is a further object to provide an improved operator possessing the foregoing characteristics and which is relatively economical to manufacture.

It is a still further object to provide an improved operator possessing the foregoing characteristics and which is readily suited to replace the constant-type of pressure-setting operator in an existing combination valve of relatively conventional design.

According to the invention there is provided an improved, compact linear operator adapted for operative combination with a gas control for controlling the positioning of an element directly associated with the operation of a valve in the control. The operator is capable of use for stepping control and/or modulating control. While in its broadest sense the operator might be directly connected to the valve, in a preferred embodiment it controls the positioning of a seat for a spring associated with a pressure regulating valve in a combination gas control. The combination gas control has a main diaphragm valve operated by a bleed line which includes a servo pressure regulator diaphragm. A pressure regulating spring is disposed in the combination gas control with one end in operative engagement with the servo pressure regulator diaphragm. The operator includes a variably positionable spring seat for operatively engaging the other end of the pressure regulating spring. That spring seat includes a plunger or shaft extending in or through a bore in a support means. The support means is adapted to be fixedly positioned in or on the combination gas control, and the spring seat and shaft are axially displaceable relative thereto for applying a variable reference force on the regulator diaphragm via the pressure regulating spring. The operator further includes a cantilevered, bimetallic actuator mounted at one end to the support means and adapted to deflect in response to an applied temperature. An electrical heater, as for instance provided by an electrical resistance bonded to the actuator, serves to controllably apply a temperature thereto. The bimetallic actuator is operatively coupled to the shaft associated with the spring seat to vary its displacement and thus the reference force of the pressure regulating spring in response to the applied temperature.

Though the bimetallic actuator might be in direct engagement with the shaft associated with the spring seat, it is preferable that amplification of the actuator's displacement be provided in order to achieve compactness. In the preferred embodiment, such amplification is afforded through the provision of a lever arrangement intermediate the bimetallic actuator and the spring seat shaft. The support for the cantilevered bimetallic actuator is located radially to one side of the spring seat shaft and the fulcrum for the lever is located radially to the other side. The free end of the bimetallic actuator engages the lever intermediate its fulcrum and a distal portion, and that distal portion of the lever actively engages the spring seat shaft.

The bimetallic actuator is preferably formed as a pair of spaced, substantially parallel arms each mounted in cantilever fashion to the support means and being connected at their distal ends by a rigid bridge which is integrally formed therewith. It is that bridge which engages the lever.

The lever may typically be a rigid, rod-like member of substantially U or V shape, with the connecting portion or apex of the lever being disposed for engagement with the spring seat means shaft.

In a preferred embodiment of the invention, the operator is of modular form for connection with a combination gas control. The combination gas control is contained within a casing having a threaded opening through a wall thereof in register with the servo pressure regulator diaphragm. The modular operator includes a support means adapted for threaded coupling engagement with the control casing at the threaded opening therein. The support means of the modular operator comprises an annular platform member having a plurality of support surfaces facing axially outward from the control casing and an externally-threaded extension which extends axially inward from the annular platform member. The bore extends axially through the support means extension. The bimetallic actuator and the lever are each mounted on a respective one of the support surfaces and the threaded extension provides the threaded coupling engagement with the threaded opening in the control casing. A domed cover is in sealing engagement with the support means and provides a housing closure for the axially outer end of the support means.

The operator further includes means for adjustably presetting a maximum gas pressure limit, as for high fire, and also means for adjustably presetting a minimum gas pressure limit during operation, as for low fire. The maximum pressure limit means comprises a rigid projection extending radially from the spring seat shaft and an adjustable stop member mounted to the support means and positioned to engage the projection so as to limit the displacement of the spring seat shaft in the pressure-increasing direction. The means for adjustably presetting the minimum pressure limit may, in a preferred embodiment, comprise an adjustment screw in axial threaded engagement with the outer end of the spring seat shaft and a fixed stop member positioned to engage the adjustment screw so as to limit displacement of the spring seat shaft in the pressure decreasing direction.

An alternate embodiment of the means for adjustably presetting the minimum pressure limit and which is particularly suited for utilization with the modular operator, comprises a separate, externally threaded annular spring stop member threaded into the threaded opening in the control casing. The spring stop member is positioned to limit axially-outward expansion of the spring, which in turn establishes the minimum pressure limit.

BEST MODE FOR CARRYING OUT THE INVENTION

Figure 1:
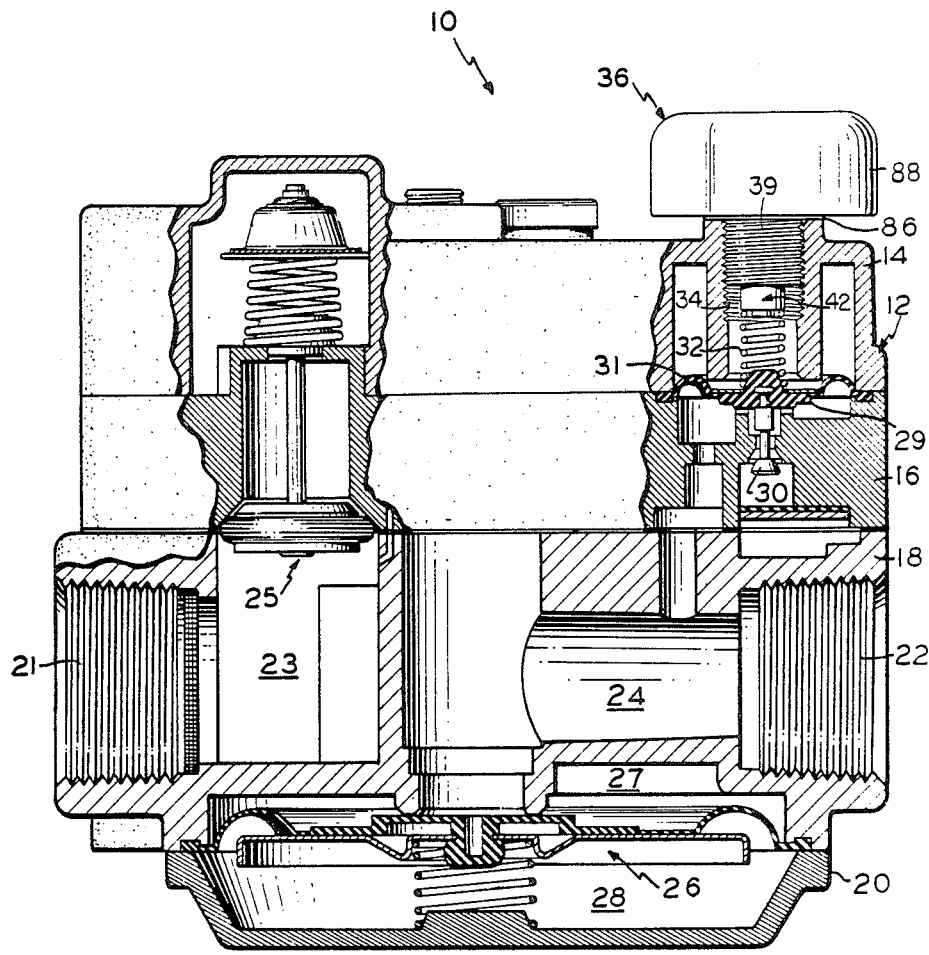
FIG. 1 is an elevational view, partly broken away and partly in section, of a combination gas control employing a modular operator in accordance with the invention.

Referring to the Figures, and initially to FIG. 1, a combination control 10 for a gas burner is shown as having a hollowed casing 12 which includes an upper housing plate 14, an intermediate partition plate 16, a main body 18 and a lower cover plate 20. The plates 14, 16 and 20 and the main body 18 are secured together in suitably sealed relation, as by screws (not shown). The combination control 10 is of the same general construction as the control depicted in the aforementioned U.S. Pat. No. 4,354,633, with the exception of the modular operator to be hereinafter described. Accordingly, the disclosure of U.S. Pat. No. 4,354,633 is incorporated herein by reference to the extent consistent herewith, and the various elements of that control will be described only very generally hereinafter.

The main body 18 is provided with a threaded inlet 21 and a threaded outlet 22 which communicate respectively with an inlet chamber 23 and an outlet chamber 24. Arranged within the combination control in a known manner between the inlet 21 and the outlet 22 are the valve member 25 of a manual main shutoff valve, a thermostatic valve (not shown), and a main diaphragm-type valve member 26. The diaphragm associated with diaphragm/valve 26 is operated by the differential gas pressure between a cavity 27 and the operating pressure chamber 28. Further, the gas pressure in the chamber 28 is controlled by a bleed flow system (not fully shown) which has a main portion extending from the cavity 27 to the outlet chamber 24 and an intermediate portion communicating with the chamber 28.

The bleed flow system may be of a form similar to that illustrated in U.S. Pat. No. 4,009,861, mentioned earlier and also incorporated herein by reference, with a main portion in which are serially connected a restriction orifice (not shown), an electromagnetically operated bleed valve (not shown), and a servo regulator 29. The servo regulator 29 is, except for the features of the invention herein, of a generally known construction in which the positioning of a servo valve member 30 is determined by the positioning of a servo diaphragm 31 connected thereto. In turn, the positioning of the servo diaphragm 31 is determined by any force differential between the pressure of gas applied to its undersurface from outlet chamber 24 and the downwardly directed reference force applied to its upper surface by a servo pressure regulating spring 32.

As described earlier, the reference force applied by the pressure regulating spring 32 is determined by the positioning of a spring seat which engages its upper end. A threaded bore 34 extends through the casing 12 of combination control 10, as for instance through upper housing plate 14, and is in registry with spring 32 and servo diaphragm 31. Although in the aforementioned combination controls of U.S. Pat. Nos. 4,009,861 and 4,354,633 the positioning of a spring seat was determined by a set screw threaded into bore 34 and set to some thereafter-constant position, in accordance with the invention there is provided a modular operator 36 in substitution for the set screw type of spring seat of the prior art.

Figure 2:
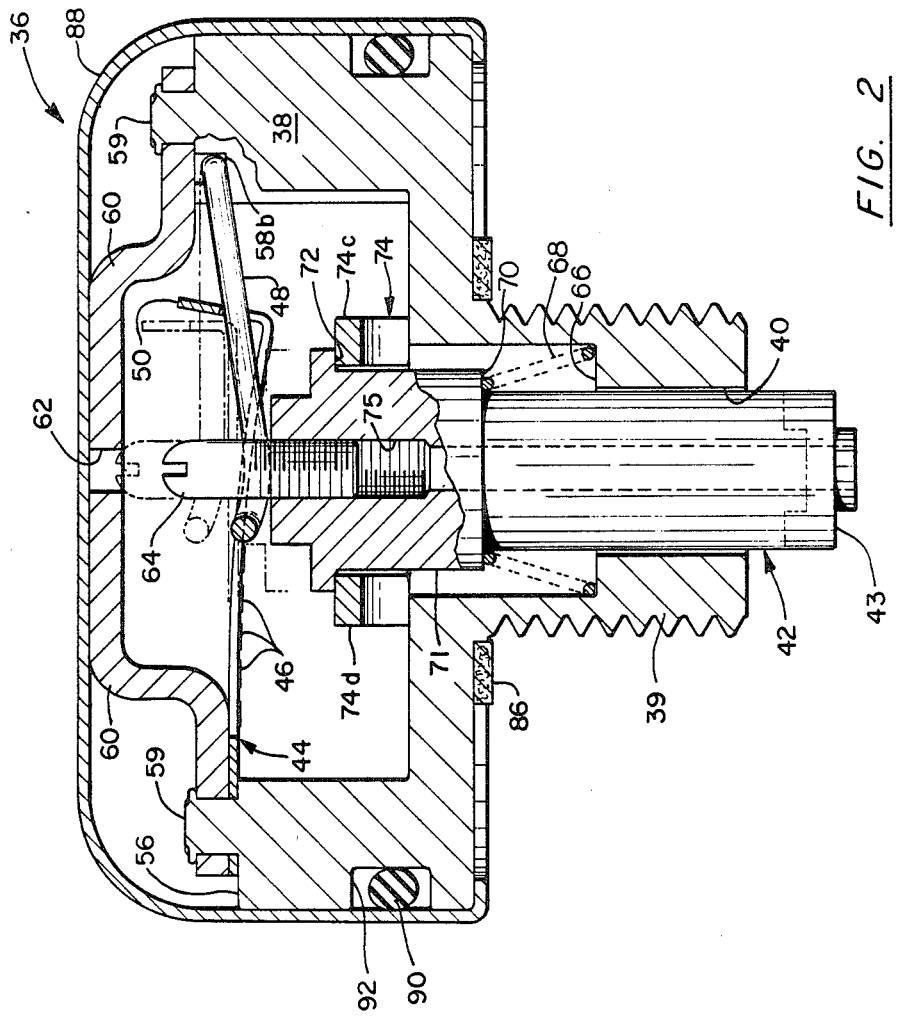
FIG. 2 is an elevational sectional view of the modular operator of FIG. 1.

The modular operator 36 is shown in FIG. 1 in operative combination with the combination control 10 via threaded, typically sealed, engagement therewith in the threaded bore 34; however, for a detailed understanding of the construction of modular operator 36, reference is made to the remaining Figures with particular reference to FIG. 2. The modular operator 36 includes a generally-circular, cup-shaped base member or support 38 having an externally-threaded extension 39 formed integrally therewith and depending therefrom at its center. Further, the support 38 includes an axial bore 40 extending through the center thereof for receiving a plunger 42 in axially slidable relation therewith. The plunger 42 is of generally-cylindrical or rod-like shape over most of its length and includes an axially-recessed, annular shoulder 43 at its lower, or axially-innermost, end for engaging, either directly or indirectly, the upper end of the regulator spring 32 (FIG. 1) and effectively providing a spring seat therefor. In the context of the present invention, it should be understood that the plunger 42 need not directly contact spring 32, but only that its displacement be imparted to the upper end of the spring at least over an operating range. For instance, an intermediate spring cup might be located between the plunger 42 and the spring 32.

A cantilevered, bimetallic actuator generally designated 44, is mounted at one end to the support 38 and is adapted to deflect in a generally axial direction relative to the support in response to an applied temperature. That temperature is typically applied by a resistance heater and, in the preferred embodiment, comprises a deposited resistive heater element 46 bonded to an insulated surface of the bimetallic actuator 44. The bimetallic actuator 44 is so structured and positioned as to be able to effectively transmit its displacement to the plunger 42, and thus to the spring seat provided by shoulder 43 on the plunger. Thus, by controlling the temperature applied to actuator 44, as by controlling the current to the heater 46, the displacement of actuator 44, plunger 42 and spring seat shoulder 43 may be controlled, thereby also controlling the reference force applied to the servo diaphragm by the pressure regulating spring 32. In this regard, it will be understood that the current to heater 46 may be controlled to effect a variety of responses by plunger 42, including step opening and/or continuously variable modulation across the operating range.

Although the displacement of bimetallic actuator 44 might be transmitted to plunger 42 by direct contact therewith, it may be difficult to obtain the requisite magnitude of actuator displacement if the structure of the modular operator 36 is to remain as small and compact as possible. Thus, in accordance with a further aspect of the invention, a mechanical amplifying structure is provided intermediate the actuator 44 and the plunger 42 for amplifying the actuator's displacement as transmitted to the plunger. This amplification structure includes a lever 48 having a support fulcrum provided at one end by the support member 38 and having its distal end region positioned for axial engagement with the plunger 42. The cantilevered bimetallic actuator 44 is supported at a location on support member 38 which is substantially diametrically opposite the fulcrum for lever 48. Moreover, the actuator 44 extends radially from its support to a position beyond the axis, or centerline, of plunger 42 for engagement with a mid-region of the lever 48 between its fulcrum and its distal region. Such arrangement provides the requisite axial displacement amplification in a configuration which is relatively compact, at least in the transverse, or radial, direction. This accommodates the situation in which a bimetallic actuator of limited length is capable only of a limited maximum displacement which is insufficient to provide the desired range of axial displacement to the spring seat shoulder 43.

Figure 3:
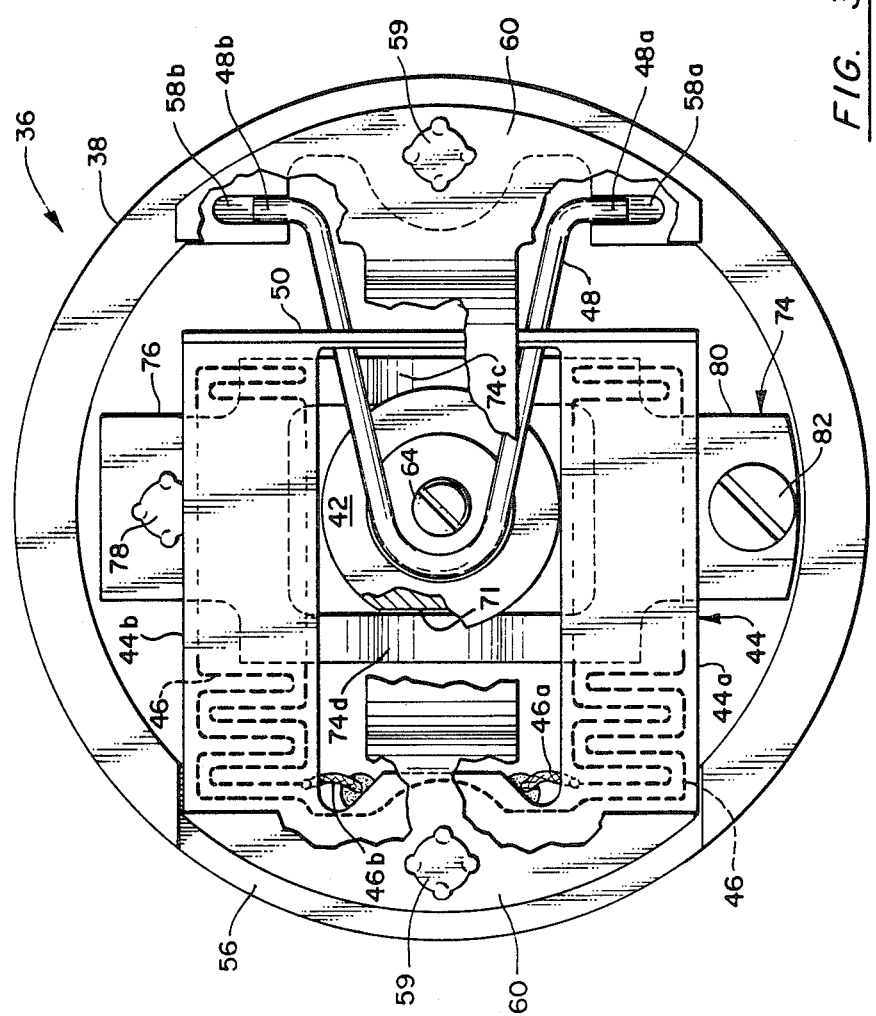
FIG. 3 is a top plan view, partly broken away, showing the modular operator of FIG. 2 with its cover removed.

Reference is now made to FIG. 3 which shows the construction of the modular operator 36 in even greater detail. The bimetallic actuator 44 includes a pair of spaced, parallel arms 44a and 44b joined at their distal end by a rigid cross arm or bridge 50. Also, for convenience, arms 44a and 44b may be rigidly connected at their supported end by a rigid, connecting base portion 52 (only partly shown in FIG. 3). The bimetallic actuator 44 is preferably formed of a single bimetallic structure in which arms 44a and 44b and connecting base portion 52 are substantially coplanar, and the bridge 50 is formed or bent upwardly at substantially 90° thereto. It is the bridge 50 of the bimetallic actuator 44 which is adapted to be in both force and displacement-transmitting engagement with the lever 48. For that reason, the edgewise orientation of bridge 50 to the plane of the remainder of the actuator 44 and to the resistance of lever 48 serves to increase its strength and/or rigidity in the axial direction. Further, the position of the 90° bend near the distal ends of the actuator forms 44a and 44b, is sufficiently rearward of those ends that the lever-contacting surface of bridge 50 is spaced somewhat above the plane of the arms 44a and 44b to provide a deadband delay, as will be described.

In accordance with the invention, the heater 46 is provided by a resistive element deposited on an insulating coating on the bottom surface of the bimetallic strip 44 and arranged in a serpentine pattern to maximize its length. A pair of lead wires 46a and 46b are connected to terminals at opposite ends of the resistive heater 46 on the respective arms 44a and 44b of actuator 44. Lead wires 46a and 46b are led through suitable sealed openings in support member 38 for connection with control circuitry (not shown). Connection between the resistive paths on each arm is provided by a continuation of the resistive heater 44 along the surface of the connecting base portion 52 of the actuator. An electrical insulator (not shown) may be interposed between heater 46 in this region and the support 38 if necessary to prevent electrical short-circuitry. The structure of the bimetallic actuator 44 is such that it remains substantially planar for ambient temperatures, but begins to deflect downward when current through heater 46 causes the temperature to exceed ambient. The bridge 50 is spaced above lever 48 at ambient temperature and typically will not move into displacement-transmitting engagement with the lever until a temperature of about 185° F. is attained. This provides a desirable deadband delay. The heater 46 is capable of providing the requisite temperatures necessary to effect full deflection of actuator 44.

The lever 48, although capable of a variety of shapes and forms, is preferably provided by a single, relatively rigid, metal wire or rod-like element, bent to a U or V shape and having the end portions of each arm bent substantially outward, oppositely of one another, to form pivot trunions 48a and 48b. The distal end of the lever 48 includes a curved connecting portion adapted to axially engage an upper end surface of the plunger 42 for transmitting the amplified displacement of the actuator 44. The distal end of lever 48 may also be angled slightly upward relative to the plane of the remainder of the lever to optimize its effectiveness in displacing the plunger 42 when the lever is pivoted downwardly.

The base member 38 is formed of a metal such as aluminum or other suitable material and is contoured to have a support surface 56 facing axially upward and adapted to support the mounted end of the bimetallic actuator 44. Support 38 similarly includes a pair of support surfaces 58a and 58b facing in an axially-upward direction for supporting the trunions 48a and 48b respectively of the lever 48. More specifically, support surfaces 58a and 58b are axially recessed from an upper end surface of support 38 and have a relatively narrow transverse dimension sized to receive the trunions 48a and 48b and permit pivoting of the lever 48, but resist radial displacement of that lever.

The support surface 56 for actuator 44 is substantially diametrically opposite the support surfaces 58a and 58b for the trunions 48a and 48b of lever 48. The lever 48 underlies the actuator 44. Arms 44a and 44b of actuator 44 extend on opposite sides of the plunger 42 and the bridge 50 is positioned to engage an intermediate portion of the lever 48. A mounting bracket 60 extends diametrically across the support 38. The bracket 60 includes a narrow, axially raised, mid-portion and a pair of angularly-flared, arcuate portions at the opposite ends. The end portions of the bracket 60 respectively overlie the base portion 52 of actuator 44 and the trunions 48a and 48b of lever 48 to maintain them in their respective mounted positions. A pair of bosses 59 extend upward from the support member 38 through corresponding holes in the end portions of bracket 60 and are staked to maintain the positioning of the bracket relative to the support member. The bracket 60 includes a centrally-located axial thru-hole 62, seen in FIG. 2, which provides access to an adjustment screw 64 prior to receiving cover 88, as will be described.

The support member 38 includes a central counter bore extending axially downward for providing an upwardly facing shoulder 66. Shoulder 66 serves as a seat for a relatively small truncated conical biasing spring 68 which has its other end in compressive engagement with an axially-inward facing shoulder 70 formed by a radial enlargement to the plunger 42 towards it upper end. That enlargement of plunger 42 includes a pair of diametrically-opposed flats 71 extending axially upward from the shoulder 70 and terminating below the upper end of the enlargement to provide a downwardly-facing shoulder 72. Shoulder 72 is positioned for displacement-limiting engagement with a high-pressure, or "high fire", stop member 74. The plunger 42, with spring seat shoulder 43, is normally urged relatively upward by biasing spring 68 toward a singular position corresponding with a "low fire" limit. The pressure regulating spring 32 will typically contribute to biasing the plunger toward that limit position, however, it may be ineffective near that limit for certain embodiments.

The reference force applied to the servo diaphragm 31 by the regulating spring 32 is generally decreased as plunger 42 moves upward and relatively increased as it moves downward. To establish a low pressure, or "low fire" limit, the plunger 42 is provided with a threaded axial bore 75 at its upper end and into which is adjustably threaded the adjustment screw 64. The axial positioning of adjustment screw 64 relative to the upper end of plunger 42 may be adjustably preset, as by access to its slotted head via the opening 62 in bracket 60. Opening 62 in bracket 60 is sufficiently narrow that the low pressure adjustment screw 64, may not pass therethrough. Thus, bracket 60 serves as a stop limit for screw 64 and thus plunger 42.

The high pressure stop member 74 is formed generally as an open, rectangular bracket having a pair of spaced parallel arms 74c and 74d extending on opposite sides of the plunger 42, adjacent the flats 71 and underlying the respective shoulders 72. The mid-portion of the stop member arms 74c and 74d is arched upwardly from the remainder of the plane of the stop member 74 to provide limiting contact with the shoulder 72 on plunger 42. At one end of the stop member 74 is a mounting tab 76. A mounting boss 78 extends upwardly from support member 38 through an opening in mounting tab 76 to locate that end of stop member 74. Boss 78 is staked to maintain that end of stop member 74 in position. An adjustment tab 80 is located at the opposite end of stop member 74. Tab 80 includes a thru-hole into which is threaded an adjustment screw 82. The bottom, or axially-inner end, of adjustment screw 82 engages an upwardly facing surface of support member 38. By adjusting the extent to which screw 82 is threaded into tab 80, the elevation or axial positioning of the arches of arms 74c and 74d of stop member 74 is controlled. This establishes the inward limit to the displacement of plunger 42 and concomitantly, determines the maximum reference force applied to the pressure regulating diaphragm, as for determining the "high fire" limit.

To satisfy certain requirements for limiting gas leakage, it is generally desirable that certain seals be provided in connection with the operator 36. As seen in FIG. 2, an annular sealing gasket 86 surrounds the upper end of the threaded base member extension 39 to provide a seal between the base member 38 and the casing 12 of the combination valve 10. As mentioned earlier, a domed cover 88 fits over the upper end of the support member 38 in contact with the bracket 60. A skirt portion of the cover 88 extends downwardly about the outer periphery of support member 38 and its lower end is rolled or crimped under the bottom of the support member. Further, an O-ring seal 90 is seated in an annular recess 92 about the outer periphery of support member 38 for providing sealing engagement between the cover 88 and the support member 38.

Referring to the operation of the modular operator 36, solid lines have been used to represent the plunger 42, actuator 44 and lever 48 in the high pressure or "high fire" limit position, whereas dotted lines have been used to represent each of those elements at its opposite extreme. With respect to plunger 42 (and lever 48), that latter extreme is the same as "low fire" limit. However, with respect to the bimetallic actuator 44, the present dotted line representation reveals that at normal ambient temperatures its bridge 50 is not even in engagement with the lever 48 in order to provide a deadband delay. By controlling the current applied to the heater 46, it is possible to deflect the actuator 44 downwardly and, following engagement with lever 48, thereby displacing the lever 48 and plunger 42 by an amount determined by the temperature applied to the actuator. It will be appreciated that due to thermal delays, the actuator 44 and thus also the plunger 42, will be caused to move in a gradual manner between steady state positions. Regulation of the heater current will result in the requisite control of the reference force applied to the servo regulator diaphragm 31, thereby providing requisite control of the regulated gas pressure.

Figure 4:
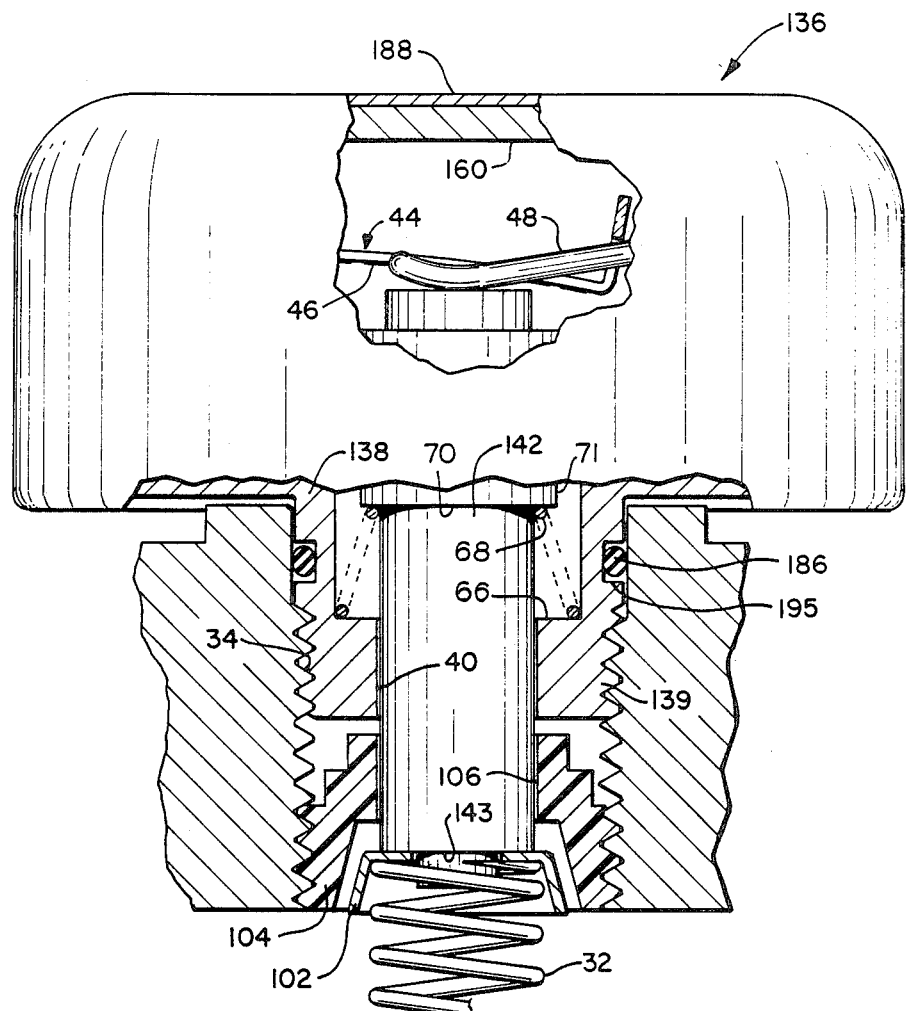
FIG. 4 is an elevational view similar to FIG. 2, partly broken away, showing an alternate embodiment of the operator and the "low fire" stop.

FIG. 4 depicts an alternate arrangement of an operator 136 for providing the low pressure or "low fire" limit otherwise provided by the adjustment screw 64 in FIG. 2. With the exception of the differences to be described, the remaining structure of operator 136 is the same as that of operator 36. The upper end of regulating spring 32 is captured in a spring cup 102, which in turn is urged by the spring into, or at least toward, axial engagement with the shoulder 143 on plunger 142. The radial extent of spring cup 102 is greater than the diameter of bore 40 in support member 138 and is thus also greater than the diameter of plunger 142 in that region. Instead of providing an adjustable "low fire" screw in the top of plunger 142, a separate externally-threaded insert 104 is threadedly inserted into bore 34 in casing 12 to limit outward movement of the spring cup 102 and spring 32. This also eliminates the need to tap a threaded bore in the top of plunger 142, which in turn obviates the need for a central thru-hole in bracket 160. The "low fire" insert 104 includes a central bore 106 through which the plunger 42 may pass in close sliding relation. The axial positioning of the insert stop 104 will thus determine the "low fire" limit, however, it will be noted that the plunger 142 is free to move axially inward, thereby moving the cup 102 inward toward, or to, the "high fire" limit. To assemble this operator, the "low-fire" insert is threaded into bore 34 during test operation until a position is reached which provides the desired "low fire" pressure. Then the operator 136 is threaded into the bore 34 to a position which, assuming actuator 44 is unheated, does not cause plunger 142 to displace spring cup 102 inwardly. Typically, this will be obtained by initially making contact between plunger 142 and spring cup 102 and then "backing off" slightly to give the desired response when a control current is applied to heater 46. Since a "low fire" adjustment screw is no longer necessary, the domed cover 188, and thus the modular operator 136, may be axially more compact. Since this embodiment anticipates some variability in the extent to which the projection 139 of operator 136 is threaded into bore 34, the sealing gasket 86 of FIG. 2 is replaced with an O-ring type seal 186 which is seated in an annular groove 195 on projection 139.

Figure 5:
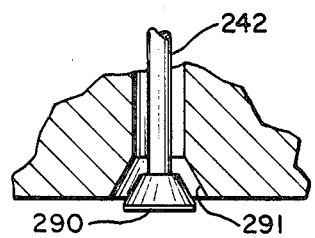
FIG. 5 is a fragmentary view of a further embodiment of the invention in which the operator is configured to directly control displacement of a valve member.

It will also be understood that although the compact linear operator of the invention has been described in connection with controlling the positioning of a seat for the regulating spring associated with a pressure regulator diaphragm, it might instead be used to directly control the position of a valve member relative to a valve seat. Such an application is depicted in FIG. 5 wherein a valve member 290 is connected to or integrally formed at the lower end of a plunger 242. Linear displacement of plunger 242 is analogous to such displacement of the plunger 42 of the FIG. 1-3 embodiment, and serves to move valve member 290 toward and away from seated engagement with valve seat 291. Such application may or may not require the inclusion of limit stops, but otherwise the operator would be substantially the same as described in connection with the FIG. 1-3 embodiment.

Although the improved, compact operator of the present invention has been disclosed in the preferred context of a modular operator 36, it will be understood that similar advantages of a compact operator assembly may be derived even if the operator is incorporated as an integral part of the combination control. In such instance, the bimetallic actuator 44, the lever 48 and plunger 42 would be contained within the housing 12 of a combination control 10.

Although this invention has been shown and described with respect to detailed embodiments thereof, it will be understood by those skilled in the art that various changes in form and detail thereof may be made without departing from the spirit and scope of the claimed invention.

Having thus described a typical embodiment of the invention, that which is claimed as new and desired to secure by Letters Patent of the United States is:

1. A modular operator adapted for operative combination with a combination gas control having a main diaphragm valve operated by a bleed line which includes a servo pressure regulator diaphragm, a pressure regulating spring having one end in operative engagement with the servo diaphragm, the combination gas control being contained within a casing having a threaded opening through a wall thereof and in register with the pressure regulating spring, the modular operator comprising:
   support means adapted for threaded coupling engagement with the control casing at the threaded opening therein, said support means including a bore extending therethrough;
   variably positionable spring seat means for operatively engaging the other end of said pressure regulating spring, said spring seat means including a shaft extending through said support means bore and being axially displaceable relative to the support means for applying a variable reference force to the servo diaphragm by said pressure regulating spring;
   a cantilevered bimetallic actuator mounted at one end to said support means and adapted to deflect in response to an applied temperature;
   electrical heater means adapted to controllably apply a temperature to said bimetallic actuator;
   said bimetallic actuator being operatively coupled to the shaft of said variably positionable spring seat means, thereby to vary the displacement of the spring seat means and thus the reference force on said servo diaphragm by said pressure regulating spring in response to said applied temperature; and
   amplifier means operatively interposed between said bimetallic actuator and the shaft of said spring seat means for amplifying the displacement provided by said actuator for transmission to said spring seat means.

2. The modular operator of claim 1 wherein said bimetallic actuator is of such geometry and orientation that said one end is mounted radially to one side of and a distal part extends substantially to the radially opposite side of said spring seat means shaft, and wherein said amplifier means includes a lever having a fulcrum, a distal region for engaging the spring seat means shaft and an intermediate region between said fulcrum and said distal region, said lever being pivotally mounted to said support means at said fulcrum and being structured and oriented for engagement at said intermediate portion by said distal part of said bimetallic actuator for amplifying the displacement thereat for transmission to said spring seat means shaft.

3. The modular operator of claim 2 wherein said bimetallic actuator comprises a pair of spaced, substantially parallel arms each mounted in cantilever fashion to said support means and having respective said distal parts, and a rigid bridge connecting said arms at their respective said distal parts, said bridge being disposed for engaging said intermediate region of said lever.

4. The modular operator of claim 3 wherein said arms and said bridge of said bimetallic actuator are integrally formed.

5. The modular operator of claim 4 wherein said heater means comprises an electrical resistance bonded to both of said arms of said bimetallic actuator.

6. The modular operator of claim 3 wherein said lever comprises a rigid, rod-like member of substantially U or V shape, with the connecting portion or apex of said lever being disposed for engagement with said spring seat means shaft.

7. The modular operator of claim 1 including means for adjustably presetting a maximum pressure limit, said maximum pressure limit means comprising a rigid radial projection extending from said spring seat means shaft and an adjustable stop member mounted to said support means and being positioned to engage said projection to limit displacement of said spring seat means shaft in one direction.

8. The modular operator of claim 7 including means for adjustably presetting a minimum pressure limit, said minimum pressure limit means comprising an adjustment screw in axial threaded engagement with a threaded bore extending axially in the outer end of the spring seat means shaft and a fixed stop member mounted to said support means and positioned to engage said adjustment screw to limit displacement of said spring seat means shaft in the direction opposite said one direction.

9. The modular operator of claim 1 including means for adjustably presetting a minimum pressure limit comprising a separate, externally-threaded insert stop member threaded into the threaded opening in said control casing and positioned to limit axially outward displacement of said spring.

10. The modular operator of claim 2 wherein said support means comprises an annular member having a plurality of support surfaces facing axially outward from the control casing and an externally threaded extension extending axially inward therefrom, said bimetallic actuator and said lever being mounted at respective ones of said support surfaces, said threaded extension providing said threaded coupling engagement with the control casing, and further including a domed cover in sealing engagement with the support means to provide a housing closure for the axially outer end of the support means.

11. A compact linear operator adapted for operative combination with a gas control having a valve, the operation of said valve being directly controlled at least partly by linear displacement effected by said operator, the operator comprising:

support means adapted to be fixedly connected with said gas control, said support means including a bore extending therethrough;

a displacement transmitting member having a displacement-receiving portion, a displacement-transmitting portion for operative association with the valve, and including an intermediate shaft extending through said support means bore and being axially displaceable relative to the support means for imparting linear displacement from said displacement-receiving portion to said displacement-transmitting portion;

a cantilevered bimetallic actuator mounted at one end to said support means and adapted to deflect in response to an applied temperature for providing a source of displacement for operative connection to said displacement-transmitting member;

electrical heater means adapted to controllably apply a temperature to said bimetallic actuator;

displacement amplifier means operatively interposed between said bimetallic actuator and said displacement-receiving portion of said displacement transmitting member for amplifying the displacement of said bimetallic actuator for transmission to said displacement-transmitting member.

12. The compact linear operator of claim 11 wherein said bimetallic actuator is of such geometry and orientation that said one end is mounted radially to one side of, and a distal part extends substantially to the radially opposite side of said displacement transmitting member shaft, and wherein said amplifier means includes a lever having a fulcrum, a distal region for engaging the displacement-receiving portion of said displacement-transmitting member and an intermediate region between said fulcrum and said distal region, said lever being pivotably mounted to said support means at said fulcrum and being structured and oriented for engagement at said intermediate portion by said distal part of said bimetallic actuator for amplifying the displacement thereat for transmission to said displacement-transmitting member.

13. A modular operator adapted for operative combination with a combination gas control having a main diaphragm valve operated by a bleed line which includes a servo pressure regulator diaphragm, a pressure regulating spring having one end in operative engagement with the servo diaphragm, the combination gas control being contained within a casing having a threaded opening through a wall thereof and in register with the pressure regulating spring, the modular operator comprising:

support means adapted for threaded coupling engagement with the control casing at the threaded opening therein, said support means including a bore extending therethrough;

variably positionable spring seat means for operatively engaging the other end of said pressure regulating spring, said spring seat means including a shaft extending through said support means bore and being axially displaceable relative to the support means for applying a variable reference force to the servo diaphragm by said pressure regulating spring;

a cantilevered bimetallic actuator mounted at one end to said support means and adapted to deflect in response to an applied temperature;

electrical heater means adapted to controllably apply a temperature to said bimetallic actuator;

said bimetallic actuator being operatively coupled to the shaft of said variably positionable spring seat means, thereby to vary the displacement of the spring seat means and thus the reference force on said servo diaphragm by said pressure regulating spring in response to said applied temperature; and means for adjustably presetting a maximum pressure limit, said maximum pressure limit means comprising a rigid radial projection extending from said spring seat means shaft and an adjustable stop member mounted to said support means and being positioned to engage said projection to limit displacement of said spring seat means shaft in one direction.

14. The modular operator of claim 13 including means for adjustably presetting a minimum pressure limit, said minimum pressure limit means comprising an adjustment screw in axial threaded engagement with a threaded bore extending axially in the outer end of the spring seat means shaft and a fixed stop member mounted to said support means and positioned to engage said adjustment screw to limit displacement of said spring seat means shaft in the direction opposite said one direction.

15. The modular operator of claim 13 including means for adjustably presetting a minimum pressure limit comprising a separate, externally-threaded insert stop member threaded into the threaded opening in said control casing and positioned to limit axially outward displacement of said spring.

16. A modular operator adapted for operative combination with a combination gas control having a main diaphragm valve operated by a bleed line which includes a servo pressure regulator diaphragm, a pressure regulating spring having one end in operative engagement with the servo diaphragm, the combination gas control being contained within a casing having a threaded opening through a wall thereof and in register with the pressure regulating spring, the modular operator comprising:

support means adapted for threaded coupling engagement with the control casing at the threaded opening therein, said support means including a bore extending therethrough;

variably positionable spring seat means for operatively engaging the other end of said pressure regulating spring, said spring seat means including a shaft extending through said support means bore and being axially displaceable relative to the support means for applying a variable reference force to the servo diaphragm by said pressure regulating spring;

a cantilevered bimetallic actuator mounted at one end to said support means and adapted to deflect in response to an applied temperature;

electrical heater means adapted to controllably apply a temperature to said bimetallic actuator;

said bimetallic actuator being operatively coupled to the shaft of said variably positionable spring seat means, thereby to vary the displacement of the spring seat means and thus the reference force on said servo diaphragm by said pressure regulating spring in response to said applied temperature; and means for adjustably presetting a minimum pressure limit comprising a separate, externally-threaded insert stop member threaded into the threaded opening in said control casing and positioned to limit axially outward displacement of said spring.

* * * * *